W. S. ADAMS.
BRAKE MECHANISM.
APPLICATION FILED DEC. 17, 1919.
1,365,364.
Patented Jan. 11, 1921.
3 SHEETS—SHEET 1.
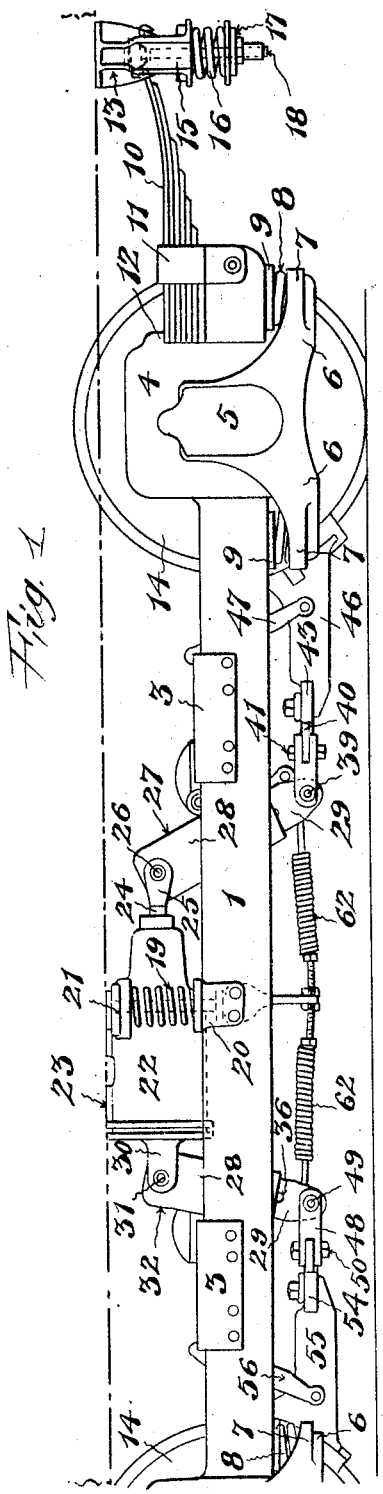
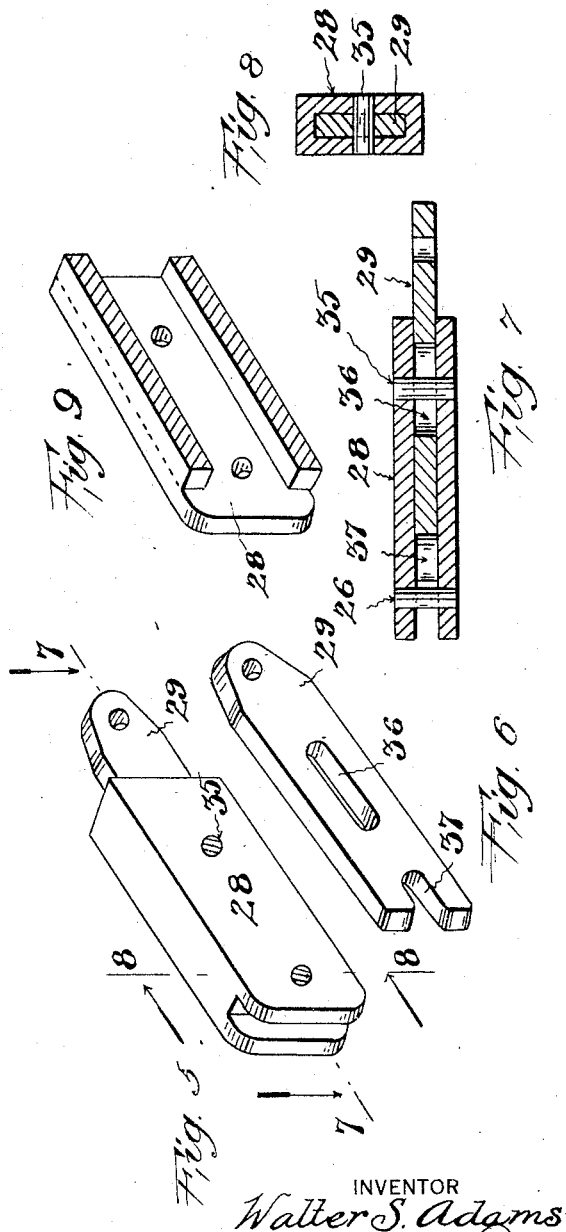
INVENTOR
Walter S. Adams
BY
ATTORNEY W. S. ADAMS.
BRAKE MECHANISM.
APPLICATION FILED DEC. 17, 1919.
1,365,364.
Patented Jan. 11, 1921.
3 SHEETS—SHEET 2.
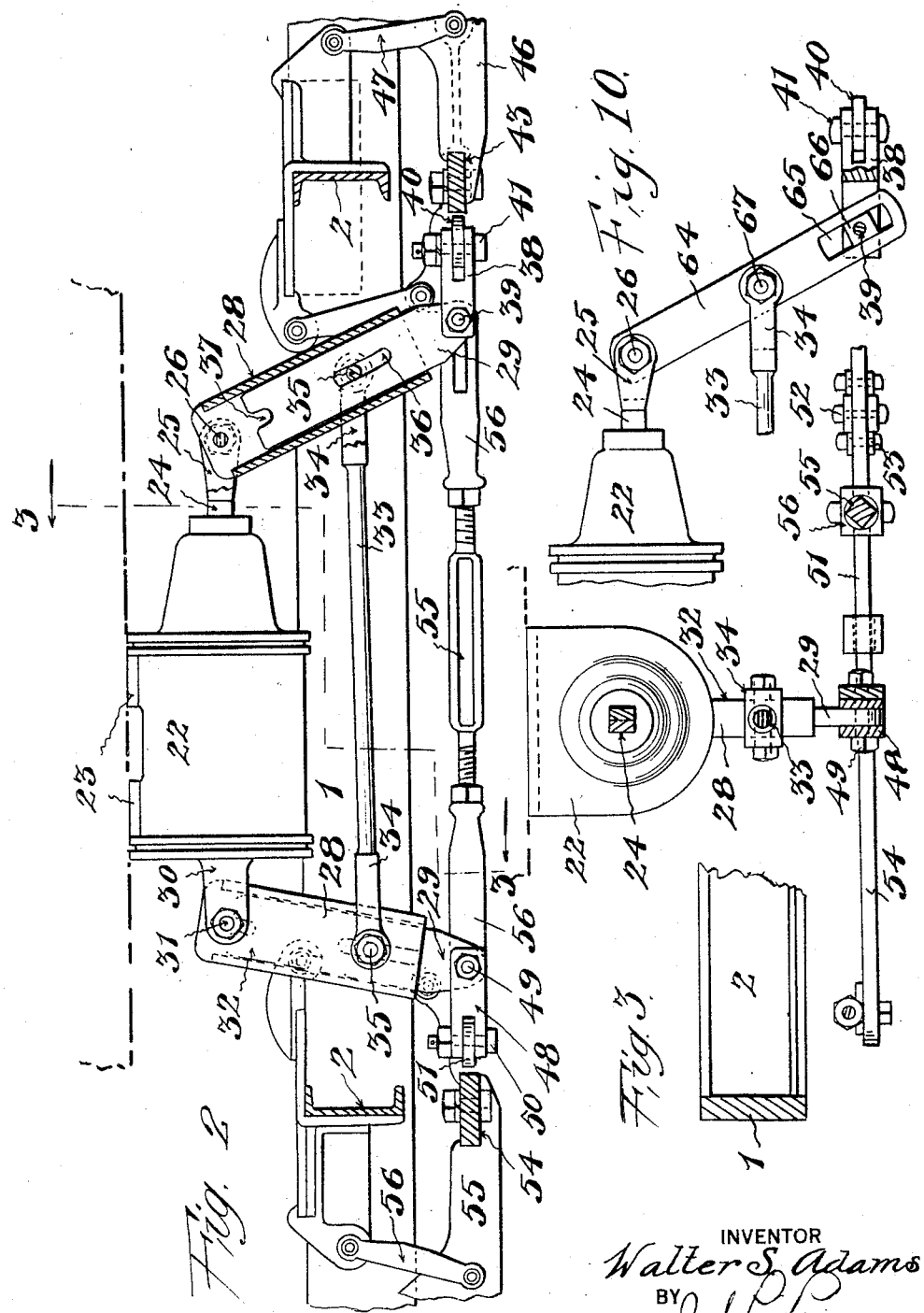
INVENTOR
Walter S. Adams
BY
Joseph L. Levy
ATTORNEY

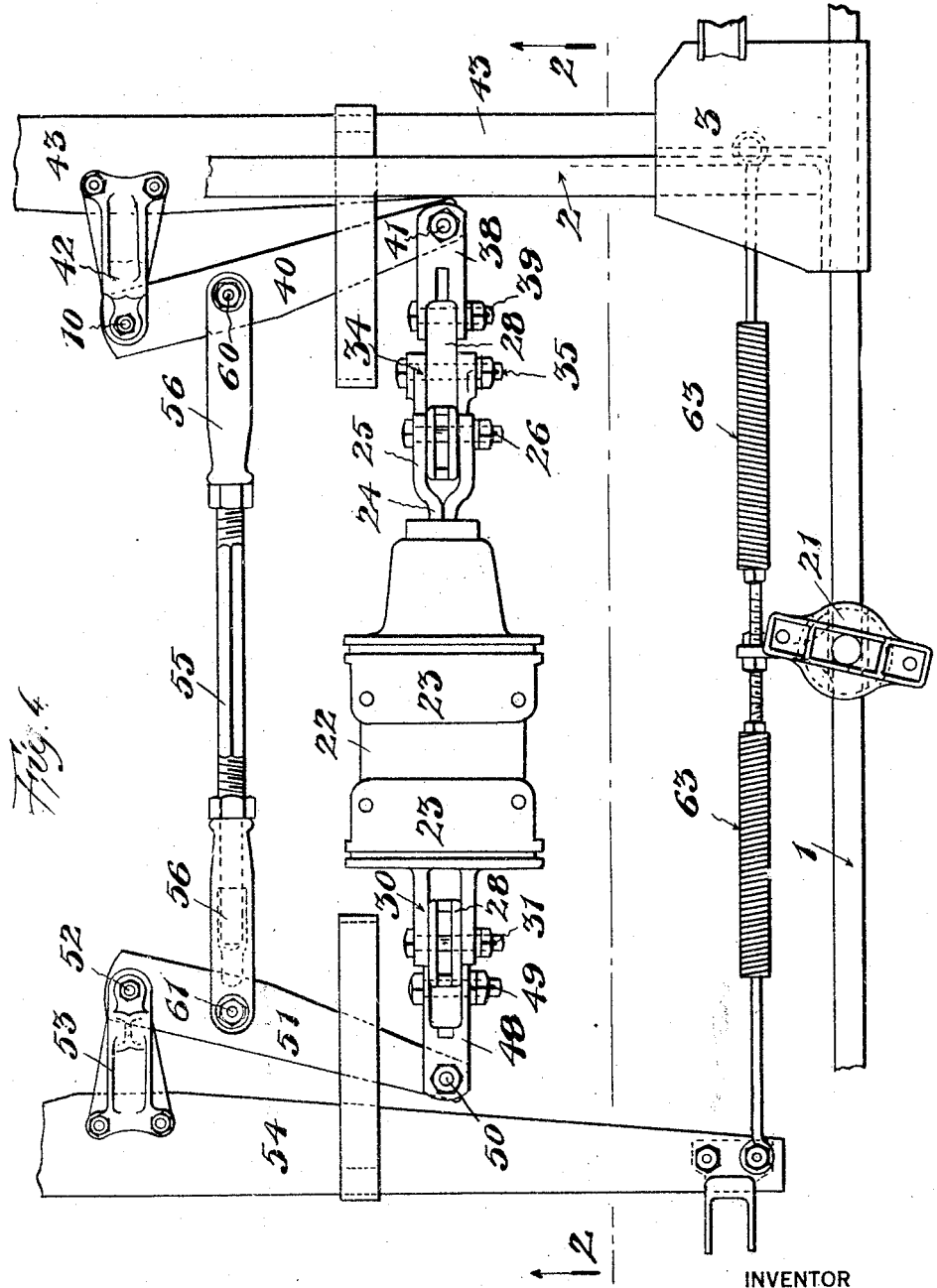

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BRAKE MECHANISM.

1,365,364.     Specification of Letters Patent.     Patented Jan. 11, 1921.

Application filed December 17, 1919. Serial No. 345,595.

*To all whom it may concern:*

Be it known that I, WALTER S. ADAMS, a citizen of the United States, and a resident of the city and county of Philadelphia, State of Pennsylvania, have invented a certain new and useful Improvement in Brake Mechanisms, of which the following is a specification.

My invention relates to an improvement in brake mechanism for railway car trucks, and has for its object to provide a means by which the degree of power exerted in effecting the application of the car brakes to the wheels may be automatically regulated by the weight imposed upon the car. Thus, when a heavy load is imposed upon the car, a greater braking force is required which, by means of my improved brake mechanism is produced by the shortening of the distance between the fulcrums of the brake levers and the points of connection of these with the brake rigging, through which braking power is transmitted to the wheels. By means of my improvement, a shortening or lengthening of these brake levers is produced automatically by means of the weight imposed upon the car and the braking force is thus increased or diminished in accordance with the load borne by the wheels.

With these objects, and other objects which may hereinafter appear, in view, I have devised the particular arrangement of parts hereinafter set forth, and more particularly pointed ont in the claims appended hereto.

Reference is to be had to the accompanying drawings, forming a part hereof, in which—

Figure 1 is a side elevation of a portion of a car truck provided with a brake mechanism constructed in accordance with my invention;

Fig. 2 is a sectional view on the line 2—2 of Fig. 4, looking in the direction of the arrows;

Fig. 3 is a sectional view on the line 3—3 of Fig. 2, looking in the direction of the arrows;

Fig. 4 is a plan view of a portion of the truck shown in Fig. 1, provided with my improved brake mechanism;

Fig. 5 is a perspective view on one of the telescopic brake levers;

Fig. 6 is a view of the inner or male member of the telescopic brake lever;

Fig. 7 is a sectional view on the line 7—7 of Fig. 5, looking in the direction of the arrows;

Fig. 8 is a sectional view on the line 8—8 of Fig. 5, looking in the direction of the arrows;

Fig. 9 is a sectional view of the outer member of the telescopic brake lever; and Fig. 10 is a modified form of brake mechanism.

Throughout the various views of the drawings, similar reference characters designate similar parts.

In the preferred embodiment of my invention, as disclosed in the accompanying drawing, I have illustrated various parts of a truck of conventional form to which my improved brake mechanism is applied, but it will be understood that the same is readily applicable to many forms of car trucks.

In the drawing, 1 indicates one of the side frames of the truck which is connected to the opposite side frame by crossings 2, which are secured to the side frames 1 by gusset plates 3.

The side frames are provided with axle box yokes 4 in which the axle boxes 5 and wheels 14 are mounted. The axle boxes are provided with laterally extending ears 6, having spring seats 7 which receive springs 8 extending from seats 9 on the side frames.

Projecting from the ends of the truck side frames are quarter elliptic leaf springs 10 which rest upon the ends of the side frames 1 and are held thereon by means of a clamping bracket 11 and coöperating with an overlying lip 12 on the axle box yoke 4. Supported on the end of the leaf spring 10 is the car body supporting bracket 13 which is provided with a spring seat 15 resting upon a coil spring 16. This coil spring 16 is supported upon a seat 17 adjustably mounted upon a pin 18, which depends downwardly from the end of the leaf spring 10. A further support for the car body is provided by the coil spring 19 which rests upon a spring seat 20 secured upon the side frame 1. On top of the spring 20 is a spring seat 21 which attaches to the underside of the car body.

By the spring arrangement above described the car body is very resiliently supported whether empty or loaded.

At 22 is shown the air brake cylinder, the upper face of which is provided with the plates 23 which attach to the car body. The air brake cylinder 22 is provided with the usual piston to which is attached the piston rod 24. The piston rod 24 is provided with a yoke 25, through which a pivot pin 26 passes and attaches to the upper end of a telescopic brake lever 27. The brake lever 27 comprises two parts, an outer sleeve member 28 and an inner member 29. The air brake cylinder is provided at its opposite end with a clevis 30 through which passes a pivot pin 31. This pivot pin 31 extends through another telescopic brake lever 32, which is identical in construction with the brake lever 27 and has the same telescopic parts consisting of the outer sleeve member 28 and inner member 29.

The telescopic brake members 27 and 32 are joined by a connecting rod or link 33 which is provided with a clevis 34 at each of its ends. Each clevis 34 embraces the exterior of one of the brake levers, and a bolt 35 passes through each clevis 34 and through both members 28 and 29 of each brake lever. These bolts 35 form the points of fulcrum for the brake levers, and it is by regulation of these points of fulcrum that the degree of braking power is regulated.

Each inner member 29 of the brake levers is provided with a longitudinal slot 36 through which the bolt 35 passes. This slot 36 permits a shortening and lengthening of the brake levers by permitting a sliding movement of the outer member 28 over the inner member when the car body moves downwardly by reason of the load imposed upon it. In its upper end each inner member 29 of each brake lever is provided with a recess 37 which permits the end of this inner member 29 to straddle the pin 26 or 31, as the case may be, should the levers telescope to such an extent as to necessitate this.

The lower end of the inner member 29 of the lever 27 attaches to a link 38 by means of a pivot bolt 39 and this link extends to and is pivotally connected to the end of a lever 40 by means of a pivot bolt 41. The lever 40 has its other end pivotally attached at 70 to a bracket 42, attached to the brake beam 43.

The brake beam 43 is attached to the usual brake shoes 46, suspended from links 47 in the conventional way.

The telescopic brake lever 32 is connected in like manner to a link 48 by a pivot bolt 49, the link 48 being identical with the link 38 and the pivot bolt 49 being similar to the bolt 39. The link 48 is pivotally connected at 50 to one end of a lever 51, and the other end of this lever is pivotally connected at 52 to a bracket 53 fixed to another brake beam 54 which is attached to the brake shoes 55 suspended from links 56.

The levers 40 and 51 are similar in construction, and are joined at the points 60 and 61, by a connecting rod 55 having a clevis 56 on each of its ends, each clevis being adjustable whereby the connecting rod 55 may be shortened or lengthened as desired.

From the foregoing, the operation of my improved brake mechanism will be readily understood.

To cause the brake to be actuated the piston in the air brake cylinder 22 is caused to operate in the conventional manner whereby it moves outwardly and forces the lever 27, which is the live lever, to pivot about its point of fulcrum 35 with the result that the lower end of the lever 27 moves in the direction of the air brake cylinder, thus pivoting the lever 40 about its axis 60 with the result that it causes the brake beam 43 to move toward the wheels and apply its shoes 46 to the wheels. When the shoes 46 contact with the wheels the axis or pivotal point of the lever 40 changes to the point 70 at which the lever 40 is pivoted to the bracket 42, whereby the rod 55 pivots the lever 51 about its pivotal point 50 which causes the other brake lever 54 to apply its shoes 55 to the other set of wheels.

After the application of the brake the shoes are freed from contact with the wheels by means of the release springs 62 and 63.

As heretofore set forth, the air brake cylinder 22 is attached to the underside of the car body. When a weight is imposed upon the car body, the car body necessarily descends and carries with it air brake cylinder 22. The telescopic levers 27 and 32 are thus shortened by this action, for when the car body descends, the outer or sleeve member 28 of each of the brake levers slides over the inner member 29, the slots 36 in each of the inner members 29 permitting this sliding or telescoping movement. The greater the weight imposed upon the car body, the shorter will be the distances between the fulcrum points 35 of the brake levers and the lower pivotal points 39 and 49. Thus it will be seen that the more the distance between the points 35 and 39 is decreased, the greater will be the leverage at the point 39 when power is exerted at the pivotal point 26, and the degree of braking power will be by reason of this, greatly increased.

From the foregoing, it will be seen that by reason of these telescopic brake levers, the length of the brake levers is automatically increased or decreased by the weight of the load imposed upon the car body whereby the braking pressure is increased or diminished in accordance with the addition or reduction of weight.

In Fig. 10 is shown a modified form of brake mechanism. Here is shown the usual air brake cylinder 22 with its piston rod 24 having the yoke 25 and pivot pin 26. Instead of using the telescopic brake levers, a lever 64 is used. This lever 64 is provided at its lower end with an elongated slot 65 in which a block 66 is adapted to slide. This block 66 is mounted in the yoke on the link 38, and extending through the block and through the yoke is the pivot bolt 39. The lever at the opposite end of the air brake cylinder is similar to that shown in Fig. 10 and both levers are connected by the rod 33 to which they are pivotally connected by the bolts 67.

In this construction it will be seen that when the car body descends the levers 64 move downwardly, bringing the pivot bolts 39 toward the upper end of the slot 65, whereby the distance between the bolt 39 and bolt 67 will be decreased.

It will be obvious that my invention is not to be restricted to the exact embodiment shown, but is broad enough to cover all structures coming within the scope of the annexed claims.

Having described my invention, what I claim is:

1. In a brake for car trucks, a brake power apparatus adapted to be supported on a car body, brake levers directly connecting the power apparatus with the truck brake rigging, a rod connecting the brake levers at a fixed distance below the brake power apparatus, and means in said levers for varying the distance between the said rod and the truck brake rigging connection.

2. In a car truck, a brake power apparatus, supported on the car body, brake levers directly connecting the power apparatus with the truck brake rigging, a rod connecting the brake levers, and means for reducing the length of the brake lever below said rod.

3. In a car truck, a brake cylinder, brake levers connected thereto, each of said brake levers comprising an outer member and an inner member, means for allowing the outer member to slide over the inner member, and brake mechanism attached to said brake levers.

4. In a car truck, an air brake cylinder, a brake lever attached to the piston rod of said cylinder, said lever comprising an outer casing, an inner member within the same, a pin passing through said inner and outer members, said outer member being slidable over said inner member.

5. In a car truck, a pair of brake levers, each of said brake levers comprising two parts, one of said parts being within the other, said parts being adapted to be moved to and from one another, whereby the length of said levers may be increased or decreased.

6. In a car truck, an air brake cylinder, a piston rod therefor, a brake lever connected to said rod, said brake lever comprising an outer member and an inner member, a slot in the inner member, a pin passing through the outer member and through the slot in the inner member, and brake mechanism connected to said lever.

7. In a car truck, an air brake cylinder, a piston rod extending therefrom, a brake lever pivotally attached to said piston rod, another brake lever pivotally attached to the cylinder, each of said levers comprising a pair of telescoping members, and a rod connecting both of the brake levers and pivoted thereto.

8. In a car truck, an air brake cylinder, a pair of brake levers depending therefrom, a rod connecting said brake levers, each of said levers comprising a sleeve, and a slotted member over which said sleeve is adapted to slide, and a pin at each end of the rod adapted to pass through both members of each brake lever and slide in the slot in the slotted member of each lever.

9. In a car truck, an air brake cylinder supported beneath a car body and a pair of telescoping brake-actuating levers depending from said air brake cylinder, and adapted to be shortened by the weight imposed upon the car body.

10. In a car truck, an air brake cylinder carried by the car body, brake rigging, a pair of brake levers connecting the brake rigging with the air brake cylinder, a rod connecting said brake levers, each of said brake levers comprising an outer sleeve and an inner member over which said sleeve is slidable, and connections between the ends of the rod and said brake levers whereby the distance between the points of connection of said rod to the brake levers and the points of connection of the brake levers with the brake rigging may be automatically varied by the weight imposed upon the car body.

11. In a car truck, an air brake cylinder carried by the car body, brake rigging, a pair of brake levers connecting the brake rigging and the air brake cylinder, a rod extending between said brake levers, each of said brake levers comprising an outer member and an inner member over which the outer member is slidable, a slot in the inner member, a pin on the end of the rod, said pin passing through said slot and being slidable therein, whereby the distance between said pin and the point of connection of the brake lever with the brake rigging may be varied by the different loads imposed upon the truck.

12. In a car truck, brake actuating means secured to the car body and movable therewith, a brake lever connecting the brake rigging and the brake actuating means, said brake lever comprising an outer sleeve and an inner member over which the sleeve is slidable, a pin extending through the sleeve and inner member and forming the point of fulcrum for said brake lever and a connection between the members of the lever and the pin whereby said lever members can slide in relation to one another to vary the longitudinal distance between the ends of said brake lever.

Signed at the city and county of Philadelphia, State of Pennsylvania, this 4th day of December, 1919.

WALTER S. ADAMS.